(12) United States Patent
Gaudreau, Jr. et al.

(10) Patent No.: US 8,596,718 B2
(45) Date of Patent: Dec. 3, 2013

(54) JUVENILE VEHICLE SEAT WITH ADJUSTABLE BASE

(75) Inventors: Paul D. Gaudreau, Jr., Indianapolis, IN (US); Raul G. Pereira, Cumberland, RI (US); Gaetano D. Desimone, Peabody, MA (US)

(73) Assignee: Cosco Management, Inc., Wilmington, DE (US)

(*) Notice: Subject to any disclaimer, the term of this patent is extended or adjusted under 35 U.S.C. 154(b) by 476 days.

(21) Appl. No.: 13/008,695

(22) Filed: Jan. 18, 2011

(65) Prior Publication Data

US 2011/0193382 A1     Aug. 11, 2011

Related U.S. Application Data

(60) Provisional application No. 61/302,837, filed on Feb. 9, 2010.

(51) Int. Cl.
*B60N 2/10* (2006.01)

(52) U.S. Cl.
USPC ............. 297/256.13; 297/256.16; 297/188.09

(58) Field of Classification Search
USPC ............... 297/256.1, 256.11, 256.13, 256.16, 297/188.08, 188.09
See application file for complete search history.

(56) References Cited

U.S. PATENT DOCUMENTS

| | | | | | |
|---|---|---|---|---|---|
| 4,688,850 | A | * | 8/1987 | Brownlie et al. | 297/270.2 |
| 5,106,154 | A | * | 4/1992 | Kain | 297/256.14 |
| 6,017,088 | A | * | 1/2000 | Stephens et al. | 297/256.16 |
| 6,299,249 | B1 | * | 10/2001 | Mori | 297/256.13 |
| 6,318,799 | B1 | * | 11/2001 | Greger et al. | 297/256.13 |
| 6,347,832 | B2 | * | 2/2002 | Mori | 297/256.13 |
| 6,428,099 | B1 | * | 8/2002 | Kain | 297/256.1 |
| 6,554,358 | B2 | | 4/2003 | Kain | |
| 6,715,830 | B2 | * | 4/2004 | Alexy | 297/250.1 |
| 7,032,966 | B2 | * | 4/2006 | Myers | 297/137 |
| 7,547,066 | B2 | * | 6/2009 | Mendenhall | 297/250.1 |
| 7,658,446 | B2 | * | 2/2010 | Meeker et al. | 297/250.1 |
| 7,887,128 | B2 | | 2/2011 | Zink et al. | |
| 8,070,227 | B2 | * | 12/2011 | Brunick et al. | 297/256.13 |
| 2011/0169310 | A1 | * | 7/2011 | Keegan et al. | 297/256.16 |

* cited by examiner

*Primary Examiner* — David Dunn
*Assistant Examiner* — Richard Lowry
(74) *Attorney, Agent, or Firm* — Barnes & Thornburg LLP

(57) ABSTRACT

A child restraint includes an adjustable base for installation on a vehicle seat and a detachable infant carrier associated with the adjustable base. The base is configured to be adjusted to tilt the infant carrier relative to the vehicle seat.

25 Claims, 7 Drawing Sheets

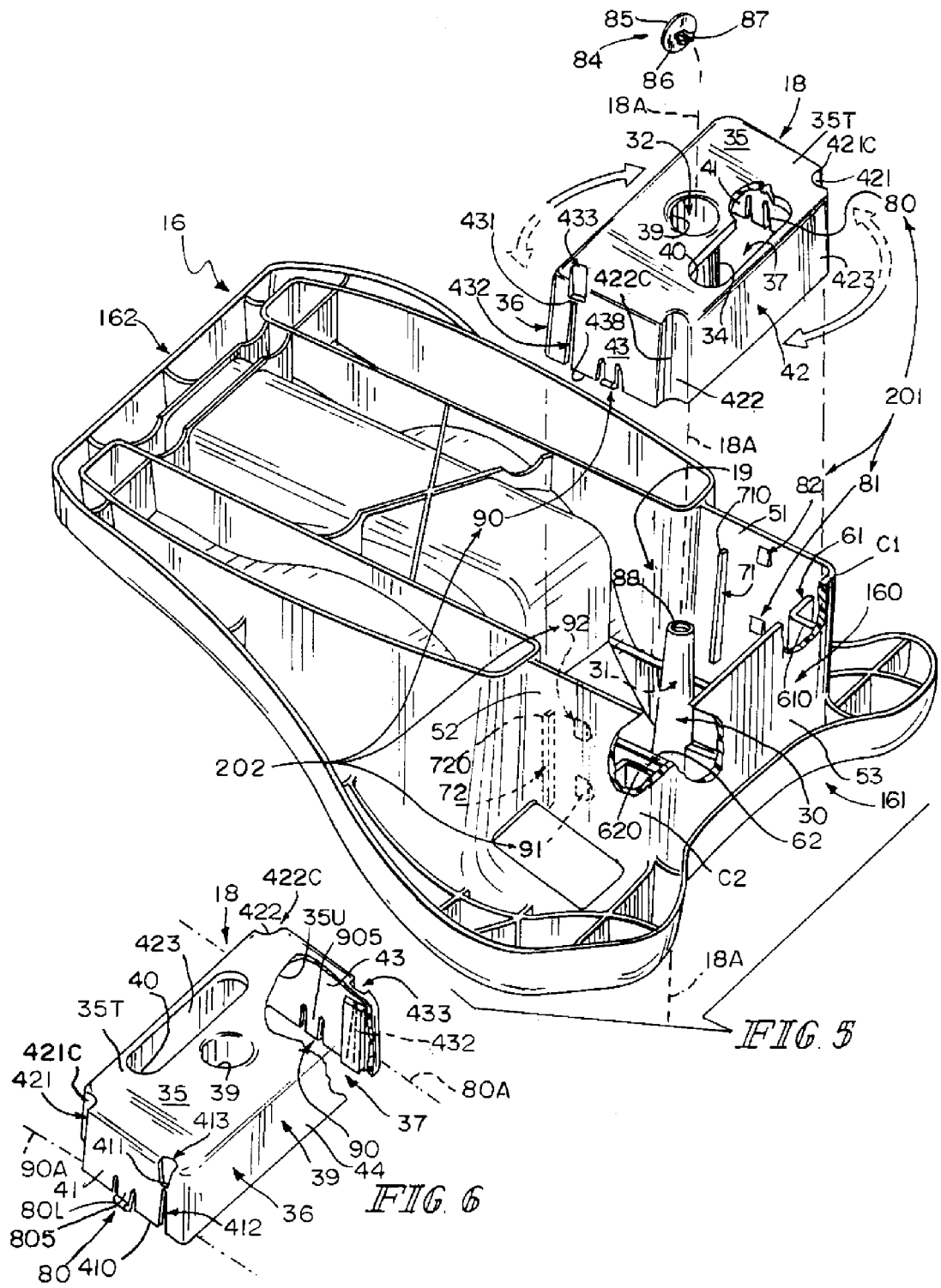

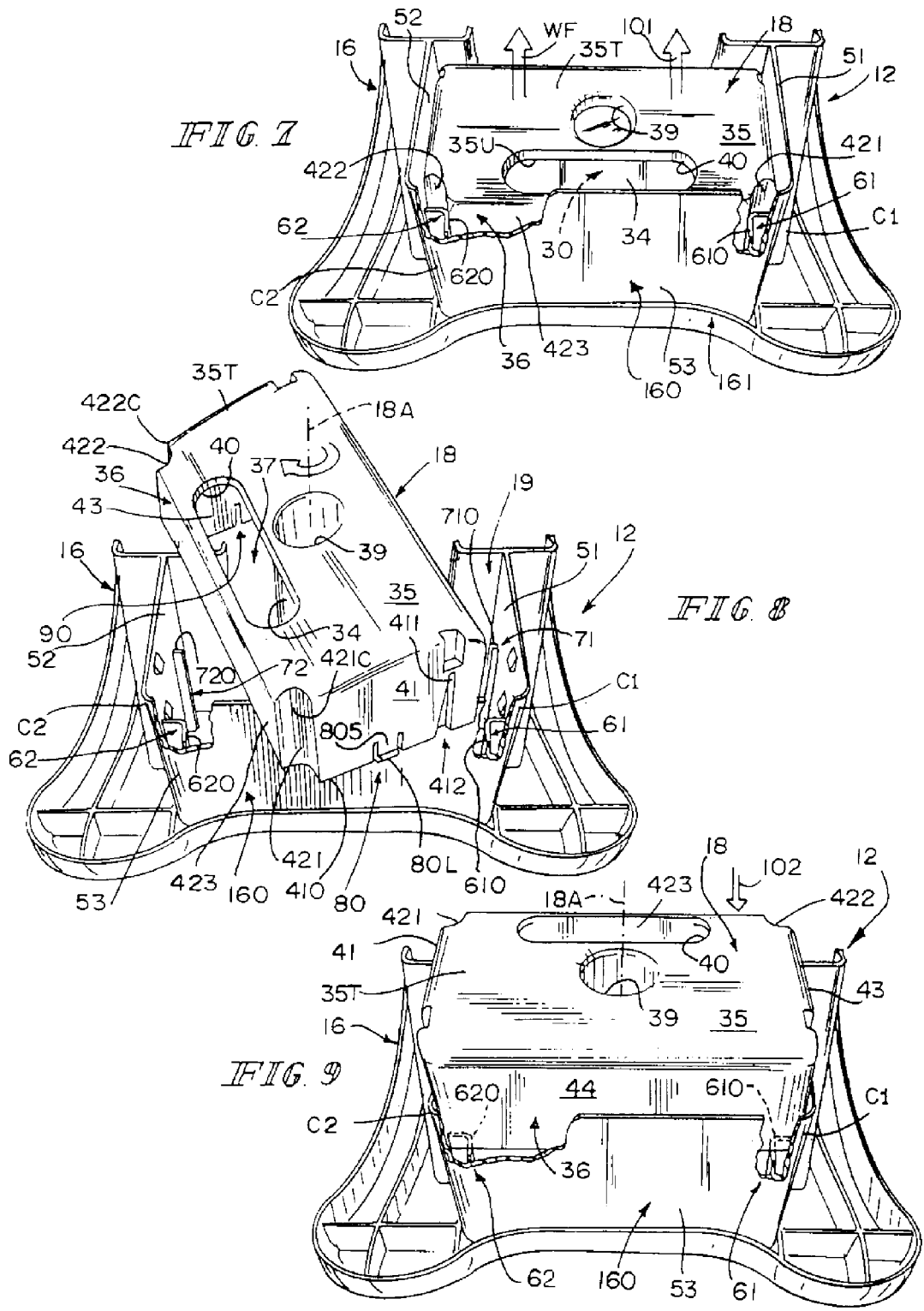

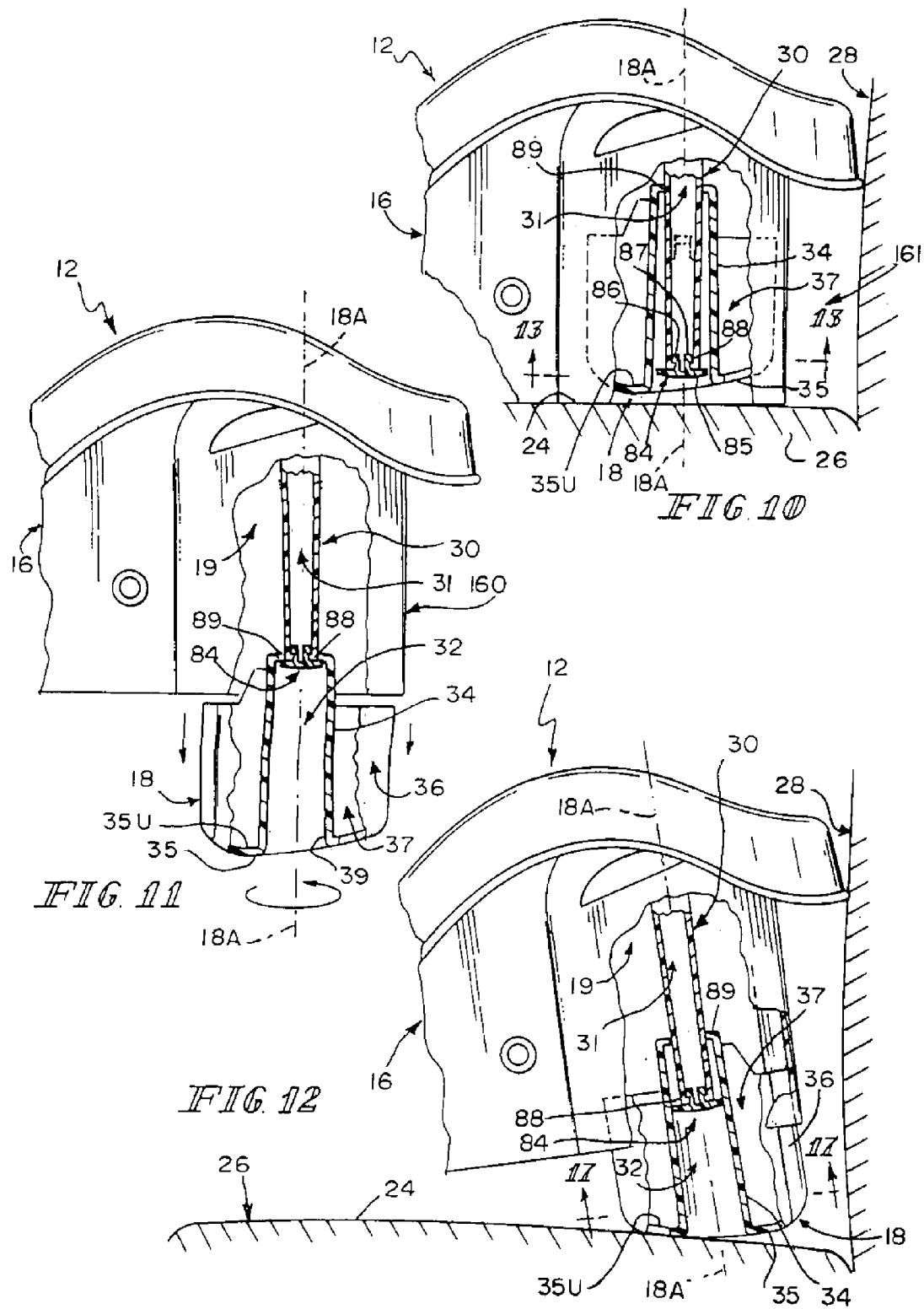

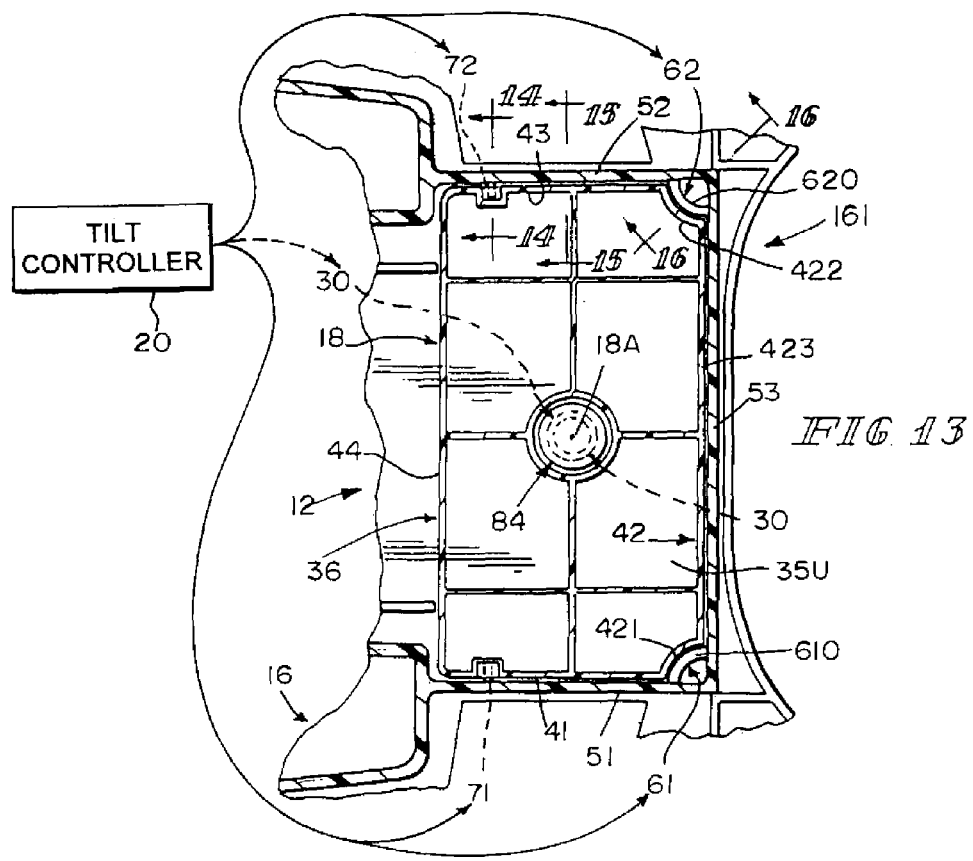
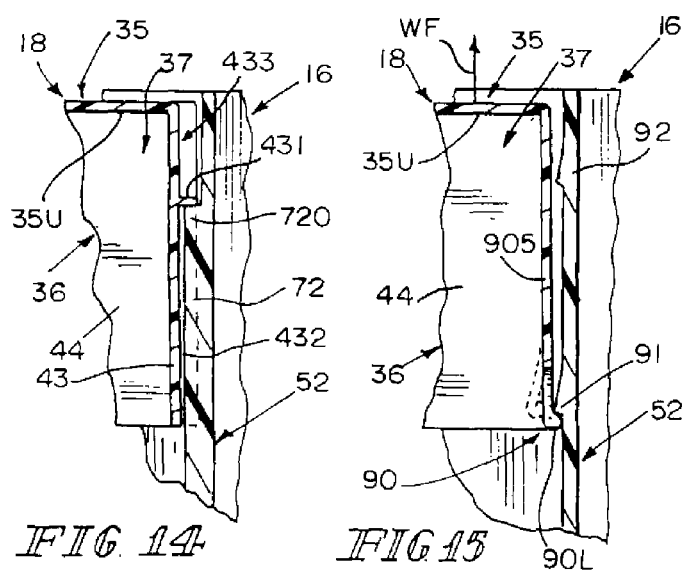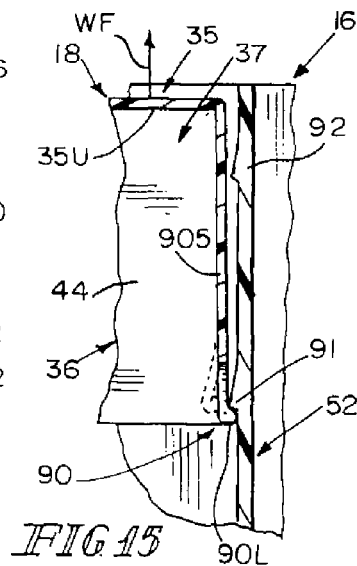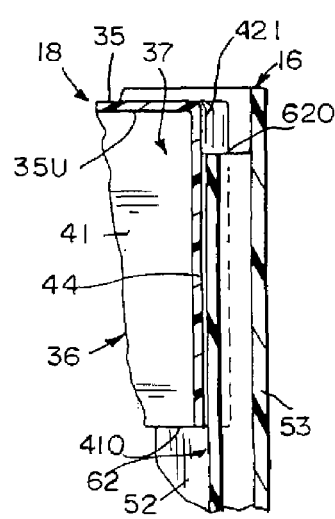

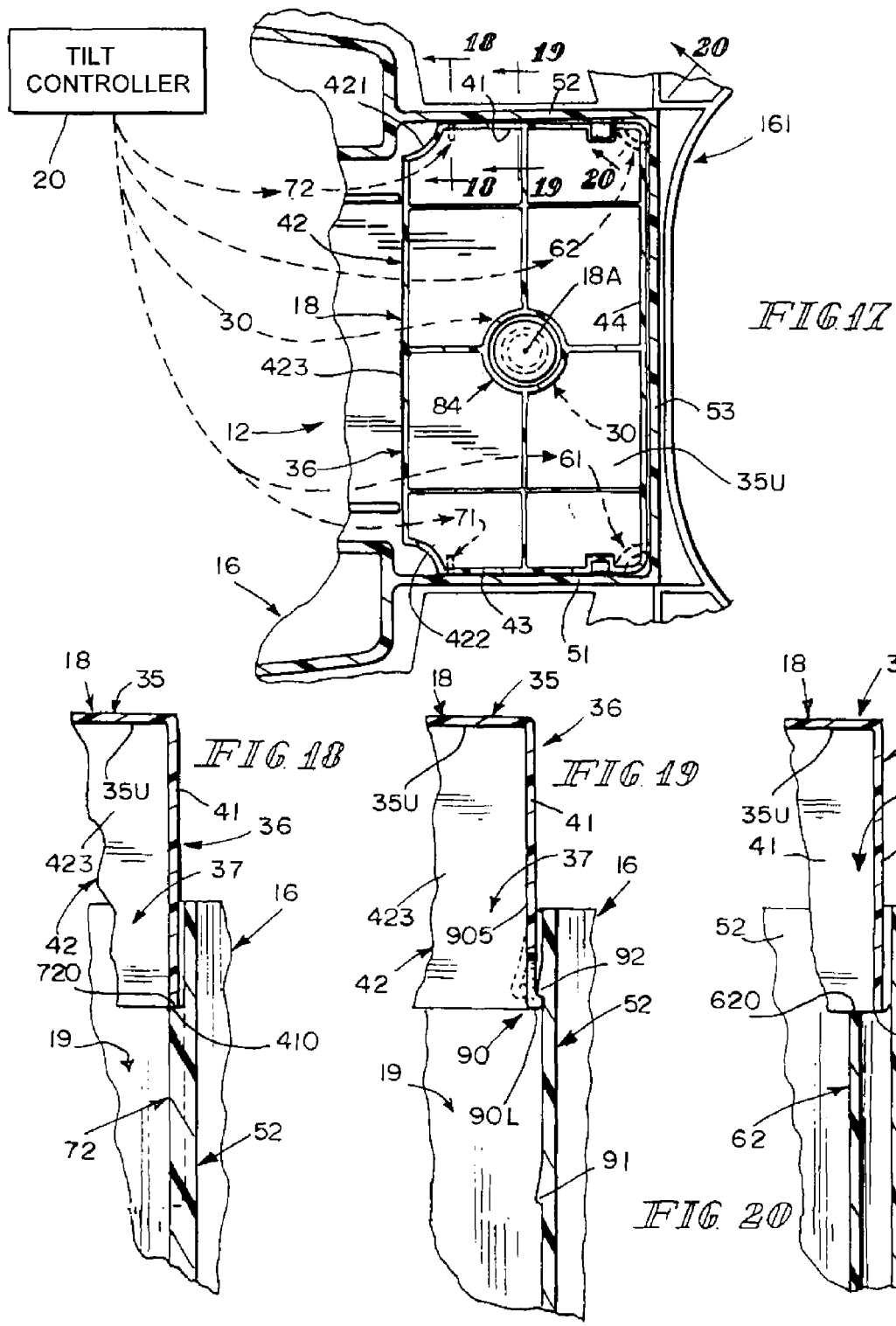

JUVENILE VEHICLE SEAT WITH ADJUSTABLE BASE

PRIORITY CLAIM

This application claims priority under 35 U.S.C. §119(e) to U.S. Provisional Application Ser. No. 61/302,837, filed Feb. 9, 2010, which is expressly incorporated by reference herein.

BACKGROUND

The present disclosure relates to child restraints and, in particular, to a juvenile vehicle seat. More particularly, the present disclosure relates to a base configured to tilt and adjust the tilt of an infant carrier included in a juvenile vehicle seat.

SUMMARY

According to the present disclosure, a child restraint includes a base for installation on a vehicle seat and an infant carrier associated with the base. The base is configured to be adjusted to tilt the infant carrier relative to the vehicle seat. In illustrative embodiments, the infant carrier is detachable from the base.

In illustrative embodiments, the adjustable base includes a tiltable carrier cradle configured to mate with the infant carrier and a movable foot mounted for movement relative to the tiltable carrier cradle. The adjustable base also includes a tilt controller coupled to the tiltable carrier cradle and to the movable foot.

The tilt controller is configured to control tilt of the tiltable carrier cradle relative to an underlying surface by managing movement of the movable foot between a retracted storage position in a foot-receiving chamber formed in the tiltable carrier cradle, a withdrawn rotation-ready position outside of the foot-receiving chamber, and an extended cradle-tilting position extending partly out of the foot-receiving chamber. The movable foot is mounted for sliding and rotating movement by a caregiver along and about an axis into and out of the foot-receiving chamber to assume a first rotation position associated with the retracted storage position and a second rotation position rotated about 180° from the first rotation position and associated with the extended cradle-tilting position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 5 is an exploded perspective assembly view of the inverted adjustable base shown in FIGS. 3 and 4 with portions broken away to show first and second outer foot supports located in corners of the foot-receiving chamber and included in the tilt controller along with an elongated first inner foot support and two small tab blockers appended to an inner surface of a first side panel defining the foot-receiving chamber and arranged to lie along the first side panel in a position between the first inner and outer foot supports and showing an upright motion-control guide post arranged to lie in a stationary position in the foot-receiving chamber and configured to provide means for supporting the movable foot for rotation about an axis extending vertically through the guide post from a first rotation position associated with retention of the movable foot in the retracted storage position shown in FIG. 3 through an angle of about 180° to a second rotation position associated with retention of the movable foot in the extended cradle-tilting position shown in FIG. 4;

FIG. 6 is a perspective view of the movable foot in the second rotation position shown in FIG. 4;

FIGS. 7-9 show how the movable foot is moved from the retracted position of FIGS. 1 and 3 to the extended position of FIGS. 2 and 4 when the adjustable base is inverted;

FIG. 10 is a side elevation view of a portion of the adjustable base when the tiltable carrier cradle is in the untilted position shown in FIG. 1;

FIG. 11 is a side elevation view showing that the movable foot has been moved along the motion-control guide post from the retracted storage position shown in FIG. 10 to a withdrawn rotation-ready position arranged to lie outside of the foot-receiving chamber formed in the tiltable carrier cradle so that the movable foot can be rotated about an axis extending vertically through the guide post to assume the second rotation position shown, for example, in FIGS. 4, 9, and 12;

FIG. 12 is a side elevation view similar to FIG. 10 after the movable foot has been moved inwardly along the axis of rotation partly into the foot-receiving chamber and retained in the extended cradle-tilting position shown in FIGS. 2, 4, and 9;

FIG. 13 is a transverse sectional view taken along lines 13-13 of FIG. 10 showing the movable foot in the first orientation associated with the retracted storage position shown in FIG. 10;

FIG. 14 is a partial sectional view taken along lines 14-14 of FIG. 13;

FIG. 15 is a partial sectional view taken along lines 15-15 of FIG. 13;

FIG. 16 is a partial sectional view taken along lines 16-16 of FIG. 13;

FIG. 17 is a transverse sectional view taken along lines 17-17 of FIG. 12 showing the movable foot in the second rotation position associated with the extended cradle-tilting position shown in FIG. 12;

FIG. 18 is a partial sectional view taken along lines 18-18 of FIG. 17;

FIG. 19 is a partial sectional view taken along lines 19-19 of FIG. 17; and

FIG. 20 is a partial sectional view taken along lines 20-20 of FIG. 17.

DETAILED DESCRIPTION

Figure 1:
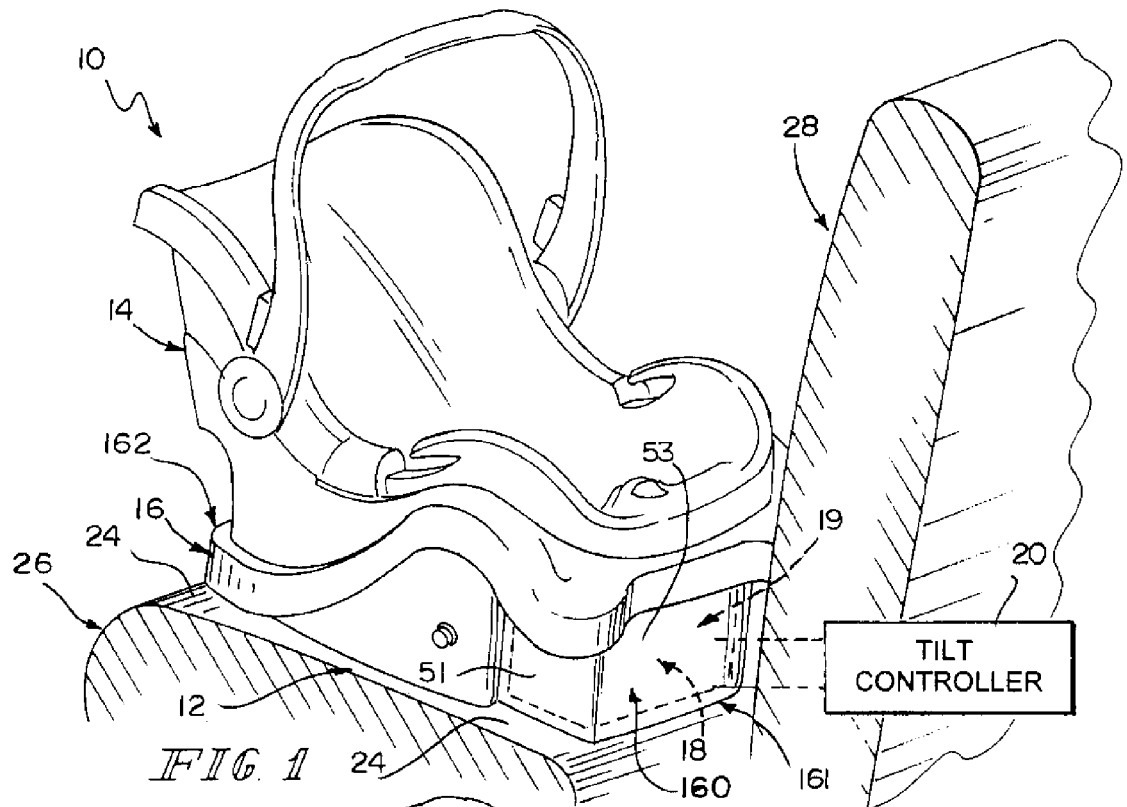
FIG. 1 is a perspective view of a child restraint including an adjustable base in accordance with the present disclosure at rest on a seat bench included in a passenger seat in a vehicle to support a detachable infant carrier (also included in the child restraint) in a rearwardly facing position facing toward a seat back included in the passenger seat and arranged to extend upwardly from the seat bench and suggesting that the adjustable base includes a tiltable carrier cradle underlying and supporting the detachable infant carrier, a movable foot (shown in phantom) housed in a foot-receiving chamber formed in the tiltable carrier cradle, and a tilt controller (shown diagrammatically) coupled to the tiltable carrier cradle and to the movable foot and configured to retain the movable foot temporarily in a retracted storage position in the foot-receiving chamber to retain the tiltable carrier cradle in an untilted (nearly horizontal) position on the seat bench.

A child restraint 10 includes an adjustable base 12 and a detachable infant carrier 14 as shown in FIG. 1. Adjustable base 12 includes a tiltable carrier cradle 16 underlying and supporting infant carrier 14, a movable foot 18 mounted for movement relative to tiltable carrier cradle 16 into and out of a foot-receiving chamber 19 formed in tiltable carrier cradle 16 as suggested in FIGS. 7-9 and 10-12, and a tilt controller 20 coupled to tiltable carrier cradle 16 and movable foot 18 and shown diagrammatically in FIGS. 1 and 2. Tilt controller 20 is operable by a caregiver to change the tilt angle of tiltable carrier cradle 16 relative to an underlying surface 24 between an untilted position shown in FIG. 1 and a tilted position shown in FIG. 2 in response to movement of movable foot 18 relative to tiltable carrier cradle 16 in a manner shown, for example, in FIGS. 7-9.

Figure 2:
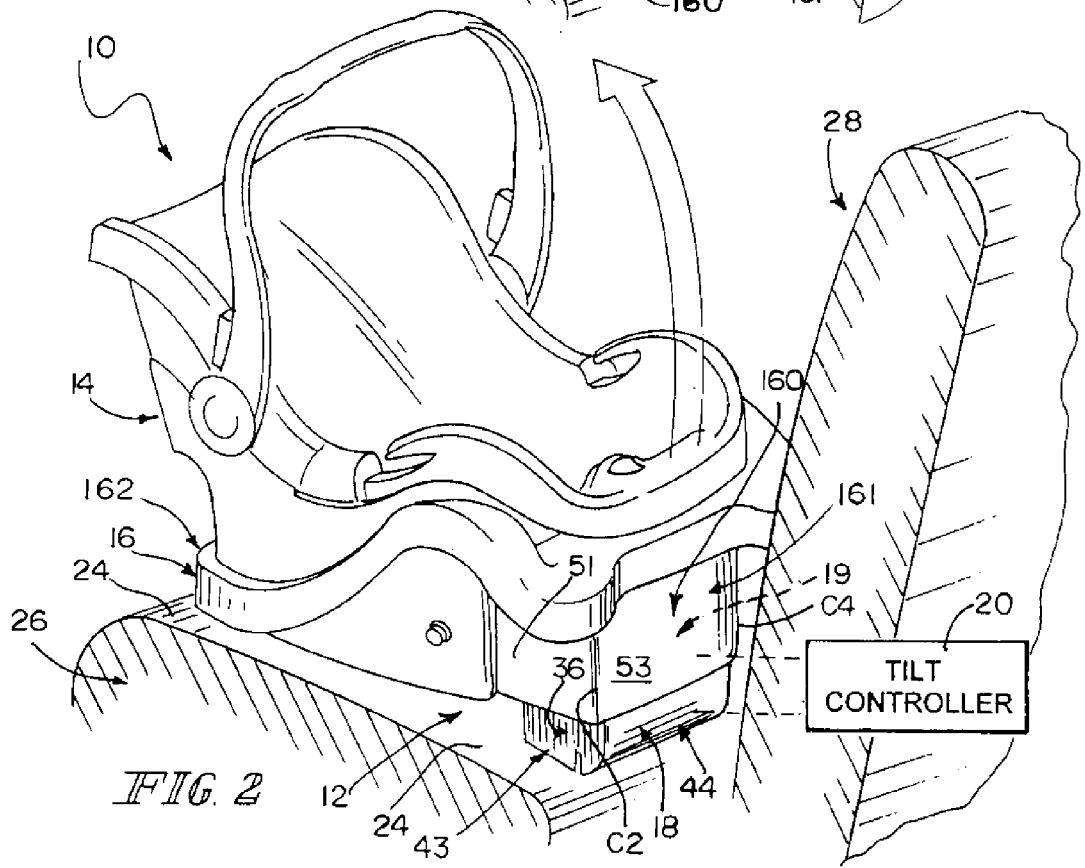
FIG. 2 is a perspective view similar to FIG. 1 showing movement of the movable foot relative to the tiltable carrier cradle to assume an extended cradle-tilting position extending partly out of the foot-receiving chamber formed in the tiltable carrier cradle and suggesting use of the tilt controller to retain the movable foot temporarily in the extended cradle-tilting position to retain the tiltable carrier cradle in a tilted (i.e., sloping) position on the seat bench.
Figure 3:
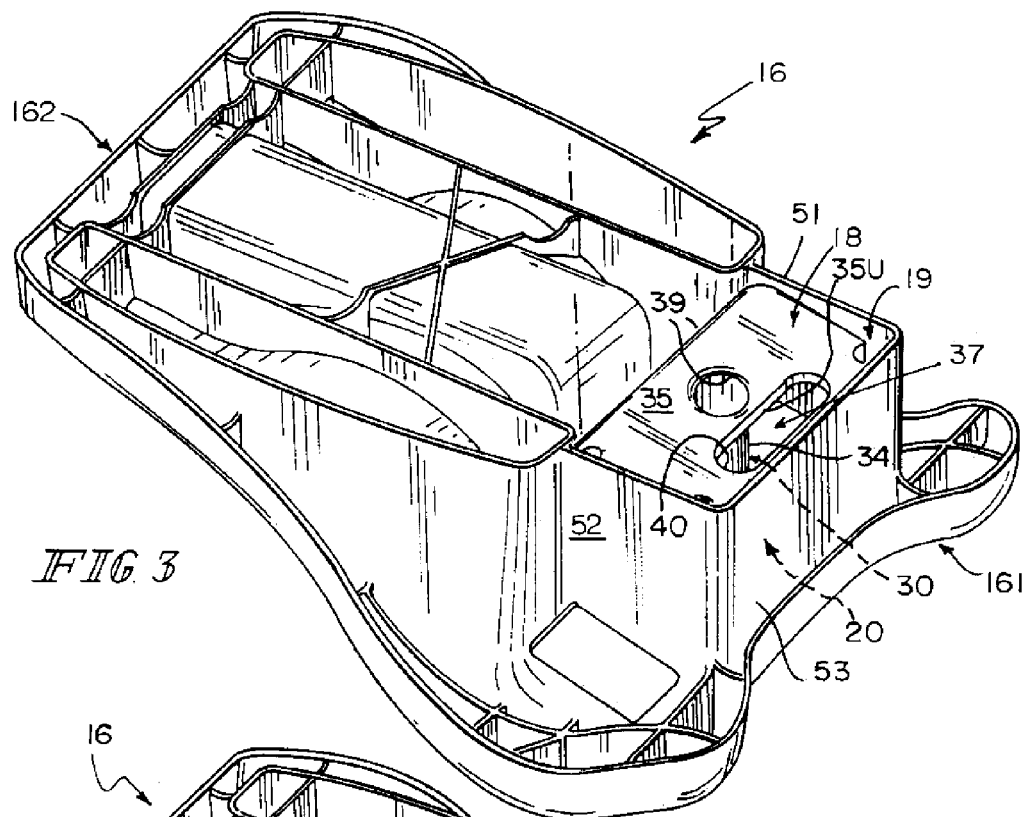
FIG. 3 is a perspective view of the adjustable base of FIG. 1 in an inverted orientation and after removal of the detachable infant carrier.
Figure 4:
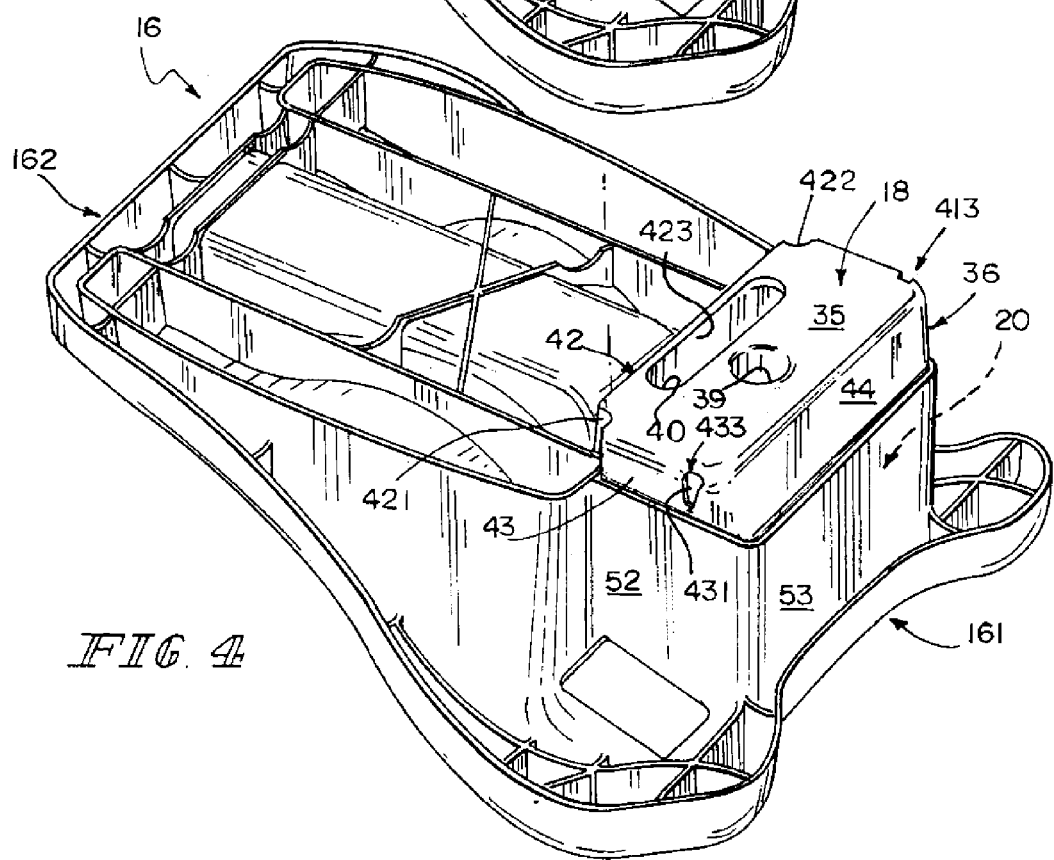
FIG. 4 is a perspective view similar to FIG. 3 showing the movable foot in the extended position shown in FIG. 2.

Tilt controller 20 is configured to provide means operable by a caregiver for orienting and locating movable foot 18 relative to tiltable carrier cradle 16 to retain movable foot 18 temporarily in either (1) a retracted storage position situated in foot-receiving chamber 19 as suggested in FIGS. 3 and 7 to establish an untilted position of tiltable carrier cradle 16 relative to an underlying top surface 24 of a seat bench 26 in a vehicle passenger seat 28 as suggested in FIGS. 1 and 10 or (2) an extended cradle-tilting position extending partly out of foot-receiving chamber 19 as suggested in FIGS. 4 and 9 to establish a tilted position of tiltable carrier cradle 16 on seat bench 26 as suggested in FIGS. 2 and 12. Tilt controller 20 illustratively includes some components (e.g. outer foot supports 61, 62 and inner foot supports 71, 72) coupled to tiltable carrier cradle 16 and other components (e.g. motion-control guide post 30) coupled to movable foot 18 as suggested in FIG. 5.

Tilt controller 20 includes an upright motion-control guide post 30 coupled to tiltable carrier cradle 16 and arranged to lie in a stationary position in foot-receiving chamber 19 as shown, for example, in FIGS. 5 and 11. Motion-control guide post 30 is arranged to extend into a central passageway 32 formed in a support sleeve 34 included in movable foot 18 when movable foot 18 is associated with tiltable carrier cradle 16 as suggested in FIGS. 5 and 10-12. Movable foot 18 is constrained to move up and down along and rotate about motion-control guide post 30 during movement of movable foot 18 relative to tiltable carrier cradle 16 between the retracted storage position and the extended cradle-tilting position as suggested in FIGS. 7-9 and 10-12.

Tilt controller 20 also includes several foot supports 61, 62, 71, and 72 included in tiltable carrier cradle 16 and arranged to lie in foot-receiving chamber 19 formed in tiltable carrier cradle 16 as suggested in FIG. 5 and to provide foundational support for movable foot 18 when movable foot 18 is moved to assume the extended cradle-tilting position as suggested in FIG. 9. Each of the spaced-apart first and second outer foot supports 61, 62 and the spaced-apart first and second inner foot supports 71, 72 are arranged to extend inwardly into foot-receiving chamber 19 in directions generally toward the motion-control guide post 30 that is located generally in the center of the somewhat rectangular-shaped (in cross-section) foot-receiving chamber 19 as suggested in FIGS. 5, 13, and 17. In illustrative embodiments, outer foot supports 61, 62 are located in stationary positions in outer corners of foot-receiving chamber 19 and inner foot supports 71, 72 are located in stationary positions along opposite side walls 51, 52 forming boundaries of foot-receiving chamber 19 as shown, for example, in FIGS. 5, 13, and 17.

In use when movable foot 18 is moved outwardly in foot-receiving chamber 19 in outward direction 101 to tiltable carrier cradle 16 to assume the extended cradle-tilting position shown in FIGS. 2, 4, 9, and 12, movable foot 18 will engage and be supported on each of foot supports 61, 62, 71, 72 as suggested in FIGS. 17, 18, and 20. Later, when movable foot 18 is moved inwardly in foot-receiving chamber 19 in inward direction 102 relative to tiltable carrier cradle 16 to assume the retracted storage position shown in FIGS. 1, 3, 7, and 10, movable foot 18 will not engage or be supported on each of foot supports 61, 62, 71, 72 because those foot supports 61, 62, 71, 72, owing to a 180° rotation of movable foot 18 about axis of rotation 18A as suggested in FIG. 8 will have moved in and now lie in companion external support-channels 421, 422, 412, 432 formed in movable foot 18 as suggested in FIGS. 7 and 13.

Motion-control guide post 30 is configured to provide means for supporting movable foot 18 for axial motion along axis 18A relative to tiltable carrier cradle 16 as suggested in FIGS. 10-12 between: (1) the retracted storage position shown in FIGS. 7 and 10; (2) a withdrawn rotation-ready position arranged to lie outside of foot-receiving chamber 19 as shown in FIGS. 8 and 11 (so that movable foot 18 can be rotated about axis 18A between a first rotation position shown in FIGS. 7 and 10 and a second rotation position shown in FIGS. 9 and 12), and (3) the extended cradle-tilting position shown in FIGS. 9 and 12. Axis 18A extends axially through central passageway 32 formed in support sleeve 34 of movable foot 18 as suggested in FIGS. 5 and 11.

Motion-control guide post 30 is also configured to provide means for supporting movable foot 18 for rotation about axis 18A as suggested in FIG. 5 through an angle of about 180° between a first rotation position associated with retention of movable foot 18 in the retracted storage position in foot-receiving chamber 19 as suggested in FIGS. 3, 7, and 10 and a second rotation position associated with retention of movable foot 18 in the extended cradle-tilting position extending partly out of foot-receiving chamber 19 as suggested in FIGS. 4, 9, and 12. Manual rotation of movable foot 18 on motion-control guide post 30 and about axis 18A between the first and second rotation positions takes place after movable foot 18 has been moved axially outwardly along axis 18A to the withdrawn rotation-ready position located wholly outside of foot-receiving chamber 19 formed in tiltable carrier cradle 16 as shown, for example, in FIGS. 8 and 11.

Movable foot 18 includes a top panel 35 and a skirt 36 appended to a perimeter edge of top panel 35 as shown, for example, in FIGS. 5 and 6. Top panel 35 and skirt 36 cooperate to form a shell 39 having an interior region 37 as suggested in FIGS. 5 and 10-12. The support sleeve 34 that is included in movable foot 18 is aligned with a central opening 39 formed in top panel 35 and appended to an underside 35U of top panel 35 to lie in a stationary position relative to top panel 35 and to mate in telescoping relation with motion-control guide post 30 of tilt controller 20 as suggested in FIGS. 5 and 10-12.

Top panel 35 of movable foot 18 is also formed to include an oblong finger-receiving slot 40 as shown in FIGS. 5 and 6. Finger-receiving slot 40 is sized and shaped to provide means for allowing a caregiver to grip a topside 35T and underside 35U of top panel 35 when movable foot 18 occupies each of the retracted storage and extended cradle-tilting positions so that movable foot 18 can be moved easily by the caregiver along and about axis 18A as suggested in FIGS. 7-9 when the caregiver desires to change the orientation and position of movable foot 18 relative to tiltable cradle carrier 16.

Skirt 36 of movable foot 18 includes, in series, a first end wall 41, a first side wall 42, a second end wall 43, and a second side wall 44 as suggested in FIGS. 5 and 6. Skirt 36 is endless in an illustrative embodiment as suggested in FIGS. 5 and 6. As suggested in FIGS. 5-7, first side wall 42 of skirt 36 includes a first concave section 421 appended to first end wall 41, a second concave section 422 appended to second end wall 43, and a plate section 423 arranged to lie between and interconnect first and second concave sections 421, 422.

First end wall 41 of skirt 36 of movable foot 18 includes a distal edge 410 and a first mount flange 411 arranged to lie between distal edge 410 and top panel 35 as suggested in FIGS. 6 and 8. First end wall 41 is formed to include an outwardly opening support-receiving channel 412 extending from distal edge 410 to first mount flange 411. First end wall 41 includes a pair of opposing strips that are arranged to lie in spaced-apart confronting relation to one another and converge toward one another so that the strips are closer to one another at first mount flange 411 and farther apart from one another at distal edge 410 as shown, for example, in FIGS. 6 and 8. In an illustrative embodiment, a cavity 413 is formed in first end wall 41 in a space provided between first mount flange 411 and top panel 35 to facilitate molding of movable foot 18 using a plastics material.

Second end wall 43 of skirt 36 of movable foot 18 includes a distal edge 430 and a second mount flange 431 arranged to lie between distal edge 430 and top panel 35 as suggested in FIG. 5. Second end wall 43 is formed to include an outwardly opening support-receiving channel 432 extending from distal edge 430 to second mount flange 431. Second end wall 43 includes a pair of opposing strips that are arranged to lie in spaced-apart confronting relation to one another and converge toward one another so that the strips are closer to one another at first mount flange 431 and farther apart from one another at distal end 430 as shown, for example, in FIG. 5. In an illustrative embodiment, a cavity 433 is formed in second end wall 43 in a space provided between second mount flange 431 and top panel 35 to facilitate molding of movable foot 18 using a plastics material.

Foot-receiving chamber 19 formed in tiltable cradle carrier 16 is bounded, in part, by first side panel 51, second side panel 52, and end panel 53 as suggested in FIGS. 3, 5, and 8. First and second side panels 51, 52 are arranged to lie in spaced-apart relation to one another to locate motion-control guide post 30 about midway therebetween. End panel 53 is arranged to extend between and interconnect first and second side panels 51, 52.

Tilt controller 20 includes spaced-apart first and second outer foot supports 61, 62 and spaced-apart first and second inner foot supports 71, 72 as suggested in an illustrative embodiment shown in FIGS. 5 and 8. Movable foot 18 is arranged to engage first and second outer foot supports 61, 62 to limit movement of movable foot 18 toward tiltable cradle carrier 16 to establish the extended cradle-tilting position of movable foot 18 on tiltable cradle carrier 16 as suggested in FIGS. 9 and 12 when the movable foot 18 has been rotated about axis 18A to assume the second rotation position. In an illustrative embodiment, distal edge 410 of first end wall 41 of movable foot 18 engages a distal end 620 of second outer foot support 62 as suggested in FIGS. 12, 17, and 20. Similarly, distal edge 430 of second end wall 43 of movable foot 18 engages a distal end 610 of first outer foot support 61. Also in an illustrative embodiment, distal edge 410 of first end wall 41 of movable foot 18 engages a distal end 710 of first inner foot support 71 as suggested in FIGS. 12, 17, and 18. Similarly, distal edge 430 of second end wall 43 of movable foot 18 engages a distal end 720 of second inner foot support 72.

Upon axially outward movement of movable foot 18 along axis 18A to assume the withdrawn rotation-ready position shown in FIG. 8 and rotation of movable foot 18 about axis 18A through an angle of about 180° to assume the second rotation position as suggested in FIG. 8, the movable foot 18 can be moved axially inwardly along axis 18A into foot-receiving chamber 19 toward tiltable carrier cradle 16 as suggested in FIG. 7 owing to (1) the exterior relief channel 421 provided for the stationary first outer foot support 61 by the companion support-receiving first concave section 421C included in the first side wall 42 of the moving skirt 36 in movable foot 18 and (2) to the exterior relief channel 422 provided for the stationary second outer foot support 62 by the companion support-receiving second concave section 422C included in that first side wall 42 of the moving skirt 36 in movable foot 18. In an illustrative embodiment, first mount flange 411 in first end wall 41 of movable foot 18 engages distal end 710 of first inner foot support 71 and second mount flange 431 in end wall 43 of movable foot 18 engages distal end 720 of first inner foot support 72 to limit further axially inward movement of movable foot 18 along axis 18A toward tiltable cradle carrier 16 to establish the retracted storage position of movable foot 18 on tiltable cradle carrier 16 as suggested in FIGS. 7, 10, 13, and 14.

Tilt controller 20 further includes a first releasable foot retainer 201 comprising a first lock tab 80 coupled to first end wall 41 of movable foot 18 and first and second tab blockers 81, 82 coupled to an inner surface of first side panel 51 of tiltable carrier cradle 16 as shown, for example, in FIG. 5. First lock tab 80 mates with companion first tab blocker 81 when movable foot 18 is moved to assume the retracted storage position to retain movable foot 18 (temporarily) in the retracted storage position shown in FIG. 1. First lock tab 80 also mates with companion second tab blocker 82 when movable foot 18 is moved to assume the extended cradle-tilting position to retain movable foot 18 (temporarily) in the extended cradle-tilting position shown in FIG. 2.

In illustrative embodiments, tilt controller 20 further includes a second releasable foot retainer 202 comprising a second lock tab 90 coupled to second end wall 43 of movable foot 18 and first and second tab blockers 91, 92 coupled to an interior surface of second side panel 52 of tiltable carrier cradle 16 as suggested, for example, in FIG. 5. Second lock tab 90 mates with companion first tab blocker 91 when movable foot 18 is moved to assume the retracted storage position as suggested in FIG. 15 to retain movable foot 18 (temporarily) in the retracted storage position shown in FIG. 1. Second lock tab 90 also mates with companion second tab blocker 92 when movable foot 18 is moved to assume the extended cradle-tilting position as suggested in FIG. 2 to retain movable foot 18 (temporarily) in the extended cradle-tilting position.

In illustrative embodiments, each of first and second lock tabs 80, 90 includes a tongue (80T or 90T) that is cantilevered to movable foot at a proximal portion thereof to move (e.g., flex/pivot) about a transverse pivot axis 80A or 90A (see FIG. 6) relative to movable foot 18 between tab blocker-engaging and tab blocker-disengaging positions. Illustrative pivotable movement of second lock tab 90 is shown, for example, in FIGS. 15 and 19 and first lock tab 80 pivots in a similar manner. Each of first and second lock tabs 80, 90 also includes a lug (80L or 90L) coupled to a free end of a companion tongue (80T or 90T) as suggested in FIGS. 5 and 6. Lug 80L of first lock tab 80 is arranged to mate with either of first or second tab blockers 81, 82 during movement of movable foot 18 along motion-control guide post 30 relative to tiltable carrier cradle 16. Lug 90L of second lock tab 90 is arranged to mate with either of first and second tab blockers 91, 92 during movement of movable foot 18 along motion-control guide post 30 relative to tiltable carrier cradle 16.

As suggested in FIG. 5, each of first and second tab blockers 81, 82 of first releasable foot retainer 201 includes an upwardly facing ramp R and a downwardly facing stop S. Lug 80L of first lock tab 80 engages ramps 81R, 82R in camming relation to cause tongue 80T to flex and/or pivot about transverse pivot axis 80A during movement of movable foot 18 into foot-receiving chamber 19. Lug 80L engages stop 81S of first tab blocker 81 to block outward movement of movable foot 18 out of foot-receiving chamber 19 until enough withdrawal force WF is applied to movable foot 18 to flex/pivot tongue 80T to cause lug 80L to disengage stop 81S. Similarly, lug 80L engages stop 82S of second tab blocker 82 to block outward movement of movable foot 18 out of foot-receiving chamber 19 toward the withdrawn rotation-ready position until enough withdrawal force WF is applied to movable foot 18 to flex/pivot tongue 80T to cause lug 80L to disengage stop 82S.

As suggested in FIGS. 5, 15, and 19, each of first and second tab blockers 91, 92 of second releasable foot retainer 202 includes an upwardly facing ramp R and a downwardly facing stop S. Lug 90L of second lock tab 90 engages ramps 91R, 92R in camming relation to cause tongue 90T to flex and/or pivot about transverse pivot axis 90A during movement of movable foot 18 into foot-receiving chamber 19. Lug 90L engages stop 91S of first tab blocker 91 to block outward movement of movable foot 18 out of foot-receiving chamber 19 until enough withdrawal force WF is applied to movable foot 18 to flex/pivot tongue 90T to cause lug 90L to disengage stop 91S. Similarly, lug 90L engages stop 92S of second tab blocker 92 to block outward movement of movable foot 18 out of foot-receiving chamber 19 toward the withdrawn rotation-ready position until enough withdrawal force WF is applied to movable foot 18 to flex/pivot tongue 90T to cause lug 90L to disengage stop 92S.

A foot anchor 84 is also included in tilt controller 20 and shown, for example, in FIG. 5. Foot anchor 84 is configured to provide means for mating with an annular lip 88 coupled to motion-control guide post 30 to block separation of movable foot 18 from motion-control guide post 30 without inhibiting rotational movement of movable foot 18 about axis 18A between the first and second rotation positions. In an illustrative embodiment, foot anchor 84 includes a round disk 85 and first and second disk anchors 86, 87 coupled to round disk 85 and configured to mate with an annular lip 88 coupled to motion-control guide post 30 as suggested in FIGS. 5 and 10. When assembled, round disk 85 of foot anchor 84 lies in central passageway 32 formed in support sleeve 34 of movable foot 18 and mates with an exterior portion of annular lip 88 and disk anchors 86, 87 extend through an opening formed in annular lip 88 into a central passageway 31 formed in motion-control guide post 30 to mate with an interior portion of annular lip 88 as shown, for example, in FIGS. 10-12. Round disk 85 also mates with an interior surface of an annular lip 89 included in movable foot 18 and coupled to a free end of support sleeve 34 as shown, for example, in FIGS. 10-12.

In use, tilt controller 20 can be operated by a caregiver as suggested in FIGS. 7-9 when adjustable base 12 is inverted to change the orientation and position of movable foot 18 relative to tiltable carrier cradle 16 so that movable foot 18 can be retained (1) in the retracted storage position to place tiltable carrier cradle 16 in an untilted (nearly horizontal) position on seat bench 26 of vehicle passenger seat 28 as shown in FIG. 1 and (2) in the extended cradle-tilting (sloping) position on seat bench 26 as shown in FIG. 2. A withdrawal force WF of sufficient magnitude can be applied by a caregiver to movable foot 18 as suggested in FIG. 7 to disengage lugs 80L, 90L of lock tabs 80, 90 from first tab blockers 81, 82 to free movable foot 18 to move in outward direction 101 out of foot-receiving chamber 19 until movable foot 18 reaches the withdrawn rotation-ready position shown in FIGS. 8 and 11. Now the caregiver rotates movable foot 18 about axis 18A as suggested in FIGS. 8 and 11 through an angle of about 180° and then movable foot 18 is moved in inward direction 102 back into foot-receiving chamber 19 as suggested in FIG. 9 to reach the extended cradle-tilting position shown in FIG. 9. Adjustable base 12 is then inverted and placed on seat bench 26 to assume the position shown in FIG. 2.

Child restraint 10 includes an adjustable base 12 and a tilt controller 20 as suggested in FIGS. 1-20. Movable foot 18 has a storage mode shown, for example, in FIGS. 1, 7, and 10 and an elevated mode shown, for example, in FIGS. 2, 9, and 12. In the storage mode, the full bottom of adjustable base 12 comes in substantially full contact with an underlying seat bench 26 of vehicle passenger seat 28 as suggested in FIG. 1. In the elevated mode, the rear portion of adjustable base 12 makes contact with seat bench 26 while movable foot 18 in the extended cradle-tilting position relative to tiltable carrier cradle 16 accounts for the balance of adjustable base 12 contact with seat bench 26 to achieve a child restraint base connection to seat bench 26. Factory assembly labor, time, and cost is minimized for child restraint 10 owing to the few discrete parts which cooperate to form child restraint 10. Use of movable foot 18 in combination with tilt controller 20 on tiltable carrier cradle 16 simplifies installation of child restraint 10 on seat bench 26.

In an illustrative embodiment, some of the components included in tilt controller 20 cooperate with tiltable carrier cradle 16 to establish a first monolithic structure molded of a plastics material and others of the components included in tilt controller 20 cooperate with movable foot 18 to establish a second monolithic structure molded of a plastics material. Tiltability of adjustable base 12 is thus provided using only two monolithic structures.

When height adjustability of adjustable base 12 is required, movable foot 18 is unlocked from a primary locking position associated with the retracted storage position, extended downward or pulled away from tiltable carrier cradle 16, rotated 180°, and pushed back into a secondary locking position within foot-receiving chamber 19 to achieve the adjusted height. Movable foot 18 is mounted on tiltable carrier cradle 16 at an assembly factory and becomes a part of the child restraint 10 and can be removed from tiltable carrier cradle 16 only by destruction of foot anchor 84 and/or surrounding components. Movable foot 18 is concealed in tiltable carrier cradle 16 when moved to assume the retracted storage position. Adjustable base 12 could also be produced and sold without movable foot 18.

Tiltable carrier cradle 16 is configured to include a foot end 161 and an opposite head end 162 as shown, for example, in FIGS. 1-5. Tiltable carrier cradle 16 is adapted to set on a seat bench 26 of a passenger seat 28 in a vehicle in one of an untilted position characterized by a first angular orientation as suggested in FIG. 1 and a tilted position characterized by a second angular orientation different from the first angular orientation as suggested in FIG. 2. Movable foot 18 is mounted for movement in a foot-receiving chamber 19 formed in the foot end 161 of tiltable carrier cradle 16 between (1) a retracted storage position lying substantially in foot-receiving chamber 19 to establish the untilted position of the tiltable carrier cradle as suggested in FIGS. 1 and 10 and (2) an extended cradle-tilting position extending partly out of foot-receiving chamber 19 as suggested in FIGS. 2 and 12 to (a) raise foot end 161 of tiltable carrier cradle 16 above seat bench 26 of passenger seat 28 while the opposite head end 162 of tiltable carrier cradle 16 remains engaged to an underlying portion of seat bench 26 and (b) change the angular orientation of tiltable carrier cradle 16 and the detachable infant carrier 14 mated therewith relative to the underlying portion of passenger seat bench 26 to establish the tilted position of tiltable carrier cradle 16.

Tilt controller 20 is coupled to tiltable carrier cradle 16 and to movable foot 18 as suggested in FIGS. 1-4, 13, and 17. Tilt controller 20 is configured to provide tilt-control means for supporting movable foot 18 for outward and inward sliding movement along an axis 18A and rotation about axis 18A to manage movement of movable foot 18 relative to tiltable carrier cradle 16 between the retracted storage position (FIG. 7) in foot-receiving chamber 19 formed in tiltable carrier cradle 16, a withdrawn rotation-ready position (FIG. 8) outside of foot-receiving chamber 19 in which movable foot 18 is free to rotate about axis 18A relative to tiltable carrier cradle 16 between a first rotation position (FIG. 7) associated with the retracted storage position and a second rotation position (FIG. 9) different from the first rotation position and associated with the extended cradle-tilting position, and the extended cradle-tilting position (FIG. 9) extending partly out of foot-receiving chamber 19 so that the angular orientation of tiltable carrier cradle 16 relative to an underlying portion of seat bench 26 is changed in response to movement of movable foot 18 between the retracted storage position and the extended cradle-tilting position.

Tilt-control means 20 includes a motion-control guide post 30 coupled to tiltable carrier cradle 16 and arranged to lie in a stationary position in foot-receiving chamber 19 as suggested in FIGS. 5 and 11. Movable foot 18 is constrained to move up and down along and rotate about motion-control guide post 30 during movement of movable foot 18 relative to tiltable carrier cradle 16 between the retracted storage position (FIGS. 7 and 10), the withdrawn rotation-ready position (FIGS. 8 and 11), and the extended cradle-tilting position (FIGS. 9 and 12).

Tiltable carrier cradle 16 includes a side wall 160 defining a portion of a boundary of foot-receiving chamber 19 as suggested in FIGS. 5 and 7-9. Tilt-control means 20 further includes a first foot support (e.g., 61) coupled to side wall 160 to lie in a stationary position in foot-receiving chamber 19. Movable foot 18 includes a shell 39 formed to include an interior region 37 and an external support-receiver channel (e.g., 412) sized to receive the first foot support therein and a support sleeve 34 coupled to shell 39 and arranged to extend in interior region 37 of shell 39 to mate along axis 18A in sliding and rotating relation with motion-control guide post 30 as suggested in FIG. 5. Shell 39 of movable foot 18 is arranged to (1) engage the first foot support of tiltable carrier cradle 16 upon rotation of movable foot 18 about axis 18A relative to side wall 160 to assume the second rotation position (FIG. 9) and movement of movable foot 18 relative to tiltable carrier cradle 16 to assume the extended cradle-tilting position to block further movement of movable foot 18 into foot-receiving chamber 19 toward the retracted storage position and (2) disengage the first foot support upon rotation of movable foot 18 about axis 18A relative to side wall 160 through an angle of about 180° to assume the first rotation position (FIG. 7) to align the first foot support coupled to side wall 160 with the companion external support-receiver channel formed in shell 39 and free the first foot support to move in the companion external support-receiver channel and movable foot 18 to move along axis 18A from the extended cradle-tilting position further into foot-receiving chamber 19 to the retracted storage position.

Side wall 160 of tiltable carrier cradle 16 includes an end panel 53 and a first side panel 51 coupled to end panel 53 to form a first corner C1 of side wall 160 as suggested in FIGS. 1 and 5. First foot support is a first outer foot support 61 coupled to first side panel 51 and to end panel 53 to lie in foot-receiving chamber 19 at first corner C1 of side wall 160. Shell 39 of movable foot 18 includes a top panel 35 coupled to support sleeve 34 and a skirt 36 coupled to a perimeter edge of top panel 35, the external support-receiver channel is a first outer external support receiver channel 421C. Skirt 36 includes a first end wall 41, a second end wall 42, and a first concave section 421 arranged to interconnect first and second end walls 41, 42 and configured to form the outer external support-receiver channel 421C.

Support sleeve 34 is coupled to the top panel 35 of shell 39 of movable foot 18 as suggested in FIG. 11. Support sleeve 34 is also arranged to lie in spaced-apart relation to the skirt 36 of the movable foot 18.

Tilt-control means 20 further includes a first inner foot support 71 coupled to first side panel 51 and arranged to lie in foot-receiving chamber 19 in spaced-apart relation to first outer foot support 61 as suggested in FIG. 5. Shell 39 of movable foot 18 is also arranged to engage first inner foot support 71 along with first outer foot support 61 to establish the extended cradle-tilting position of movable foot 18 during movement of movable foot 18 along axis 18A from the withdrawn rotation-ready position (FIG. 11) toward the extended cradle-tilting position (FIG. 12) while the movable foot remains in the second rotation position (FIG. 9). First end wall 41 of the skirt 36 is also formed to include an inner external support-receiver channel 412 arranged to lie in spaced-apart relation to the outer external support-receiver channel 421C. First inner foot support 71 is free to move in inner external support-receiver channel 412 while first outer foot support 61 moves in outer external support-receiver channel 421C during movement of movable foot 18 along axis 18A from the extended cradle-tilting position further into foot-receiving chamber 19 to the retracted storage position while movable foot 18 remains in the first rotation position (FIG. 7).

First end wall 41 of skirt 36 of movable foot 18 includes a distal edge 410 and a first mount flange 411 arranged to lie between distal edge 410 and top panel 35 as suggested in FIG. 6. First end wall 41 includes a pair of opposing strips that are arranged to lie in spaced-apart confronting relation to one another and converge toward one another so that the strips are closer to one another at first mount flange 411 and cooperate to form an outwardly opening cavity 413 in a space provided between first mount flange 411 and top panel 35 to facilitate molding of movable foot 18 using a plastics material.

Tilt-control means 20 further includes a second inner foot support 72 coupled to side wall 160 to lie in a stationary position in foot-receiving chamber 19 as suggested in FIG. 5.

Shell 39 is arranged to engage first and second inner foot supports 71, 72 during movement of movable foot 18 along axis 18A from the withdrawn rotation-ready position (FIG. 11) toward the extendable cradle-tilting position (FIG. 12) while movable foot 18 remains in the second rotation position (FIG. 9). Shell 39 of movable foot 18 includes a top wall 35 coupled to support sleeve 34 and a skirt 36 coupled to a perimeter edge of top wall 35 and arranged to cooperate with top wall 35 to form interior region 37 of shell 39 as suggested in FIG. 6. Skirt 36 is formed to include first inner external support receiver channel 412 and also a second inner external support-receiver channel 432. Second inner foot support 72 is free to move in second inner external support-receiver channel 432 while first inner foot support 71 moves in first inner external support-receiver channel 412 during movement of movable foot 18 along axis 18A from the extended cradle-tilting position further into foot-receiving chamber 19 to the retracted storage position while movable foot 18 remains in the first rotation position (FIG. 7).

Side wall 160 of tiltable carrier cradle 16 includes a first side panel 51, a second side panel 52 arranged to lie in spaced-apart confronting relation to first side panel 51 to locate motion-control guide post 30 therebetween, and an end panel 53 arranged to interconnect first and second side panels 51, 52 and cooperate with first side panel 51 to form a first corner C1 of side wall 160 as suggested in FIGS. 5 and 7-9. Second side panel 52 and end panel 53 cooperate to form a second corner C2 of side wall 160 as suggested in FIGS. 5 and 7-9.

Tilt-control means 20 further includes a first outer foot support 61 coupled to first side panel 51 and to end panel 53 to lie in foot-receiving chamber 19 at first corner C1 of side wall 160. Skirt 36 of shell 39 includes a first end wall 41 formed to include the first inner external support-receiver channel 412, a third end wall 43 arranged to lie in spaced-apart relation to first end wall 41 to locate support sleeve 34 therebetween and formed to include second external support-receiver channel 432, a second end wall 42 arranged to cooperate with first and third end walls 41, 43 to form a boundary portion of interior region 37 of shell 39, and a first concave section 421. First concave section 421 is arranged to interconnect first and second end walls 41, 42 and configured to form an outer external support-receiver channel 421C providing means for allowing free movement of first outer foot support 61 therein during movement of first inner foot support 71 in first inner external support-receiver channel 412 and the second inner foot support 72 in second inner external support-receiver channel 432 while movable foot 18 remains in the first rotation position (FIG. 7) and moves from the extended cradle-tilting position to the retracted storage position.

Movable foot 18 includes a shell 39 mounted for movement relative to tiltable carrier cradle 16 and formed to include an interior region 37 communicating with foot-receiving chamber 19 as suggested in FIGS. 10 and 12. Movable foot 18 also includes a support sleeve 34 coupled to shell 39 and arranged to lie in interior region 37 of shell 39. Motion-control guide post 30 is arranged to extend into a central passageway 32 formed in support sleeve 34 to support support sleeve 34 on motion-control guide post 30 for sliding movement along and rotating movement about axis 18A during movement of movable foot 18 relative to tiltable carrier cradle 16.

Tilt-control means 20 further includes an annular lip 88 coupled to motion-control guide post 30 and a foot anchor 84 located in central passageway 32 formed in support sleeve 34 as suggested in FIGS. 10-12. Foot anchor 84 is configured to provide means for mating with annular lip 88 coupled to motion-control guide post 30 to block separation of movable foot 18 without inhibiting sliding movement of movable foot 18 along axis 18A from the retracted storage position to the withdrawn rotation-ready position and without inhibiting rotational movement of movable foot 18 about axis 18A from the first rotation position (FIG. 7) to the second rotation position (FIG. 9).

Movable foot 18 further includes an annular lip 89 coupled to a free end of support sleeve 34 as suggested in FIGS. 10-12. Foot anchor 84 is arranged to lie in central passageway 32 and in spaced-apart relation to annular lip 88 coupled to motion-control guide post 30 when movable foot 18 is moved to assume the retracted storage position. Foot anchor 84 is arranged to lie in central passageway 32 and engage annular lip 89 coupled to support sleeve 34 upon movement of movable foot 18 out of foot-receiving chamber 19 to establish the withdrawn rotation-ready position of movable foot 18 outside foot-receiving chamber 19 without inhibiting rotation of movable foot 18 about axis 18A from the first rotation position (FIG. 7) to the second rotation position (FIG. 9).

Tilt-control means 20 further includes a first releasable foot retainer comprising a first lock tab 80 coupled to movable foot 18 and first and second tab blockers 81, 82 coupled to an inner surface of tiltable carrier cradle 16 and arranged to lie in the foot-receiving chamber. First lock tab 80 is arranged to mate with first tab blocker 81 when movable foot 18 is moved to assume the retracted storage position to retain movable foot 18 temporarily in the retracted storage position. First lock tab 80 is also arranged to mate with second tab blocker 82 when movable foot 18 is moved to assume the extended cradle-tilting position to retain movable foot 18 temporarily in the extended cradle-tilting position.

First lock tab 80 includes a tongue 80T that is cantilevered to movable foot 18 at a proximal portion thereof to move about a transverse pivot axis 80A relative to movable foot 18 between a tab blocker-engaging position engaging one of the first and second tab blockers 81, 82 and a tab blocker-disengaging position disengaging the one of the first and second tab blockers 81, 82. First lock tab also includes a lug 80L coupled to a free end of tongue 80T and arranged to mate in sequence with the first and second tab blockers 81, 82 during movement of movable foot 18 along axis 18A relative to tiltable carrier cradle 16.

The invention claimed is:
1. A child restraint comprising
an adjustable base including a tiltable carrier cradle configured to include a foot end and an opposite head end and adapted to set on a passenger seat in a vehicle in one of an untilted position characterized by a first angular orientation and a tilted position characterized by a second angular orientation different from the first angular orientation and
a detachable infant carrier configured to mate temporarily with the tiltable carrier cradle, and wherein the adjustable base further includes
a movable foot mounted for movement in a foot-receiving chamber formed in the foot end of the tiltable carrier cradle between a retracted storage position lying substantially in the foot-receiving chamber to establish the untilted position of the tiltable carrier cradle and an extended cradle-tilting position extending partly out of the foot-receiving chamber to raise the foot end of the tiltable carrier cradle above the passenger seat while the opposite head end of the tiltable carrier cradle remains engaged to an underlying portion of the passenger seat and change the angular orientation of the tiltable carrier cradle and the detachable infant carrier mated therewith relative to the underlying portion of the passenger seat to establish the tilted position of the tiltable carrier cradle, and a tilt controller coupled to the tiltable carrier cradle and to the movable foot and configured to provide tilt-control means for supporting the movable foot for outward and inward sliding movement along an axis and rotation about the axis to manage movement of the movable foot relative to the tiltable carrier cradle between the retracted storage position in the foot-receiving chamber formed in the tiltable carrier cradle, a withdrawn rotation-ready position outside of the foot-receiving chamber in which the movable foot is free to rotate about the axis relative to the tiltable carrier cradle between a first rotation position associated with the retracted storage position and a second rotation position different from the first rotation position and associated with the extended cradle-tilting position, and the extended cradle-tilting position extending partly out of the foot-receiving chamber so that the angular orientation of the tiltable carrier cradle relative to an underlying portion of the passenger seat is changed in response to movement of the movable foot between the retracted storage position and the extended cradle-tilting position.

2. The child restraint of claim 1, wherein the tilt-control means includes a motion-control guide post coupled to the tiltable carrier cradle and arranged to lie in a stationary position in the foot-receiving chamber and the movable foot is constrained to move up and down along and rotate about the motion-control guide post during movement of the movable foot relative to the tiltable carrier cradle between the retracted storage position, the withdrawn rotation-ready position, and the extended cradle-tilting position.

3. The child restraint of claim 2, wherein the tiltable carrier cradle includes a side wall defining a portion of a boundary of the foot-receiving chamber, the tilt-control means further includes a first foot support coupled to the side wall to lie in a stationary position in the foot-receiving chamber, the movable foot includes a shell formed to include an interior region and an external support-receiver channel sized to receive the first foot support therein and a support sleeve coupled to the shell and arranged to extend in the interior region of the shell to mate along the axis in sliding and rotating relation with the motion-control guide post, and the shell of the movable foot is arranged to engage the first foot support of the tiltable carrier cradle upon rotation of the movable foot about the axis relative to the side wall to assume the second rotation position and movement of the movable foot relative to the tiltable carrier cradle to assume the extended cradle-tilting position to block further movement of the movable foot into the foot-receiving chamber toward the retracted storage position and to disengage the first foot support upon rotation of the movable foot about the axis relative to the side wall through an angle of about 180° to assume the first rotation position to align the first foot support coupled to the side wall with the external support-receiver channel formed in the shell and free the first foot support to move in the external support-receiver channel and the movable foot to move along the axis from the extended cradle-tilting position further into the foot-receiving chamber to the retracted storage position.

4. The child restraint of claim 3, wherein the side wall of the tiltable carrier cradle includes an end panel and a first side panel coupled to the end panel to form a first corner of the side wall and the first foot support is a first outer foot support coupled to the first side panel and to the end panel to lie in the foot-receiving chamber at the first corner of the side wall, the shell of the movable foot includes a top panel coupled to the support sleeve and a skirt coupled to a perimeter edge of the top panel, the external support-receiver channel is a first outer external support receiver channel, and the skirt includes a first end wall, a second end wall, and a first concave section arranged to interconnect the first and second end walls and configured to form the outer external support-receiver channel.

5. The child restraint of claim 4, wherein the support sleeve is coupled to the top panel of the shell of the movable foot and arranged to lie in spaced-apart relation to the skirt of the movable foot.

6. The child restraint of claim 4, wherein the tilt-control means further includes a first inner foot support coupled to the first side panel and arranged to lie in the foot-receiving chamber in spaced-apart relation to the first outer foot support and the shell of the movable foot is also arranged to engage the first inner foot support along with the first outer foot support to establish the extended cradle-tilting position of the movable foot during movement of the movable foot along the axis from the withdrawn rotation-ready position toward the extended cradle-tilting position while the movable foot remains in the second rotation position, the first end wall of the skirt is also formed to include an inner external support-receiver channel arranged to lie in spaced-apart relation to the outer external support-receiver channel, and the first inner foot support is free to move in the inner external support-receiver channel while the first outer foot support moves in the outer external support-receiver channel during movement of the movable foot along the axis from the extended cradle-tilting position further into the foot-receiving chamber to the retracted storage position while the movable foot remains in the first rotation position.

7. The child restraint of claim 4, wherein the tilt-control means further includes a first releasable foot retainer comprising a first lock tab coupled to the first end wall of the skirt and first and second tab blockers coupled to an inner surface of the first side panel of the tiltable carrier cradle and arranged to lie in the foot-receiving chamber, the first lock tab is arranged to mate with the first tab blocker when the movable foot is moved to assume the retracted storage position to retain the movable foot temporarily in the retracted storage position, and the first lock tab is also arranged to mate with the second tab blocker when the movable foot is moved to assume the extended cradle-tilting position to retain the movable foot temporarily in the extended cradle-tilting position.

8. The child restraint of claim 4, wherein the first end wall of skirt of movable foot includes a distal edge and a first mount flange arranged to lie between the distal edge and the top panel and the first end wall includes a pair of opposing strips that are arranged to lie in spaced-apart confronting relation to one another and converge toward one another so that the strips are closer to one another at the first mount flange and cooperate to form an outwardly opening cavity in a space provided between the first mount flange and the top panel to facilitate molding of the movable foot using a plastics material.

9. The child restraint of claim 3, wherein the first foot support is a first inner foot support, the tilt-control means further includes a second inner foot support coupled to the side wall to lie in a stationary position in the foot-receiving chamber, the shell is arranged to engage the first and second inner foot supports during movement of the movable foot along the axis from the withdrawn rotation-ready position toward the extendable cradle-tilting position while the movable foot remains in the second rotation position, the shell of the movable foot includes a top wall coupled to the support sleeve and a skirt coupled to a perimeter edge of the top wall and arranged to cooperate with the top wall to form the interior region of the shell, the external support-receiver channel is a first inner external support-receiver channel, the skirt is formed to include the first inner external support receiver channel and also a second inner external support-receiver channel, and the second inner foot support is free to move in the second inner external support-receiver channel while the first inner foot support moves in the first inner external support-receiver channel during movement of the movable foot along the axis from the extended cradle-tilting position further into the foot-receiving chamber to the retracted storage position while the movable foot remains in the first rotation position.

10. The child restraint of claim 9, wherein the side wall of the tiltable carrier cradle includes a first side panel, a second side panel arranged to lie in spaced-apart confronting relation to the first side panel to locate the motion-control guide post therebetween, and an end panel arranged to interconnect the first and second side panels and cooperate with the first side panel to form a first corner of the side wall, the tilt-control means further includes a first outer foot support coupled to the first side panel and to the end panel to lie in the foot-receiving chamber at the first corner of the side wall, the skirt of the shell includes a first end wall formed to include the first inner external support-receiver channel, a third end wall arranged to lie in spaced-apart relation to the first end wall to locate the support sleeve therebetween and formed to include the second external support-receiver channel, a second end wall arranged to cooperate with the first and third end walls to form a boundary portion of the interior region of the shell, and a first concave section arranged to interconnect the first and second end walls and configured to form an outer external support-receiver channel providing means for allowing free movement of the first outer foot support therein during movement of the first inner foot support in the first inner external support-receiver channel and the second inner foot support in the second inner external support-receiver channel while the movable foot remains in the first rotation position and moves from the extended cradle-tilting position to the retracted storage position.

11. The child restraint of claim 2, wherein the movable foot includes a shell mounted for movement relative to the tiltable carrier cradle and formed to include an interior region communicating with the foot-receiving chamber and a support sleeve coupled to the shell and arranged to lie in the interior region of the shell and the motion-control guide post is arranged to extend into a central passageway formed in the support sleeve to support the support sleeve on the motion-control guide post for sliding movement along and rotating movement about the axis during movement of the movable foot relative to the tiltable carrier cradle.

12. The child restraint of claim 11, wherein the tilt-control means further includes an annular lip coupled to motion-control guide post and a foot anchor located in the central passageway formed in the support sleeve and configured to provide means for mating with the annular lip coupled to the motion-control guide post to block separation of the movable foot without inhibiting sliding movement of the movable foot along the axis from the retracted storage position to the withdrawn rotation-ready position and without inhibiting rotational movement of the movable foot about the axis from the first rotation position to the second rotation position.

13. The child restraint of claim 10, wherein the movable foot further includes an annular lip coupled to a free end of the support sleeve and the foot anchor is arranged to lie in the central passageway and in spaced-apart relation to the annular lip coupled to the motion-control guide post when the movable foot is moved to assume the retracted storage position and the foot anchor is arranged to lie in the central passageway and engage the annular lip coupled to the support sleeve upon movement of the movable foot out of the foot-receiving chamber to establish the withdrawn rotation-ready position of the movable foot outside the foot-receiving chamber without inhibiting rotation of the movable foot about the axis from the first rotation position to the second rotation position.

14. The child restraint of claim 1, wherein the tilt-control means further includes a first releasable foot retainer comprising a first lock tab coupled to the movable foot and first and second tab blockers coupled to an inner surface of the tiltable carrier cradle and arranged to lie in the foot-receiving chamber, the first lock tab is arranged to mate with the first tab blocker when the movable foot is moved to assume the retracted storage position to retain the movable foot temporarily in the retracted storage position, and the first lock tab is also arranged to mate with the second tab blocker when the movable foot is moved to assume the extended cradle-tilting position to retain the movable foot temporarily in the extended cradle-tilting position.

15. The child restraint of claim 14, wherein the first lock tab includes a tongue that is cantilevered to the movable foot at a proximal portion thereof to move about a transverse pivot axis relative to the movable foot between a tab blocker-engaging position engaging one of the first and second tab blockers and a tab blocker-disengaging position disengaging the one of the first and second tab blockers and the first lock tab also includes a lug coupled to a free end of the tongue and arranged to mate in sequence with the first and second tab blockers during movement of the movable foot along the axis relative to the tiltable carrier cradle.

16. The child restraint of claim 15, wherein each of the first and second tab blockers of the first releasable foot retainer includes an upwardly facing ramp and a downwardly facing stop, the lug of the first lock tab engages the upwardly facing ramps in camming relation to cause the tongue to move about the transverse pivot axis during movement of the movable foot into foot-receiving chamber, the lug is arranged to engage the downwardly facing stop of the first tab blocker to block outward movement of the movable foot out of the foot-receiving chamber until enough withdrawal force is applied to the movable foot to move the tongue to cause the lug to disengage the downwardly facing stop, the lug is arranged to engage the downwardly facing stop of the second tab blocker to block outward movement of movable foot out of the foot-receiving chamber toward the withdrawn rotation-ready position until enough withdrawal force is applied to the movable foot to move the tongue to cause the lug to disengage the downwardly facing stop.

17. A child restraint comprises a base for installation on a vehicle seat and an infant carrier associated with the base, wherein the base is configured to be adjusted to tilt the infant carrier relative to the vehicle seat, the infant carrier is detachable from the base, the base includes a tiltable carrier cradle configured to mate with the infant carrier, a movable foot mounted for movement relative to the tiltable carrier cradle, and a tilt controller coupled to the tiltable carrier cradle and to the movable foot, the tilt controller is configured to provide means for controlling tilt of the tiltable carrier cradle relative to an underlying surface by managing movement of the movable foot between a retracted storage position in a foot-receiving chamber formed in the tiltable carrier cradle, a withdrawn rotation-ready position outside of the foot-receiving chamber, and an extended cradle-tilting position extending partly out of the foot-receiving chamber, and the movable foot is mounted for sliding and rotating movement along and about an axis into and out of the foot-receiving chamber to assume a first rotation position associated with the retracted storage position and a second rotation position rotated about 180° from the first rotation position and associated with the extended cradle-tilting position.

18. The child restraint of claim 17, wherein the tilt controller includes an upright motion-control guide post coupled to the tiltable carrier cradle and arranged to lie in a stationary position in the foot-receiving chamber, the motion-control guide post is arranged to extend into a central passageway formed in a support sleeve included in the movable foot, the movable foot is constrained to move up and down along and rotate about the motion-control guide post during movement of the movable foot relative to the tiltable carrier cradle between the retracted storage position and the extended cradle-tilting position.

19. The child restraint of claim 18, wherein the tilt controller also includes several foot supports included in the tiltable carrier cradle and arranged to lie in the foot-receiving chamber formed in the tiltable carrier cradle and to provide foundational support for the movable foot when movable foot is moved to assume the extended cradle-tilting position.

20. The child restraint of claim 19, wherein the foot supports comprise spaced-apart first and second outer foot supports and first and second inner foot supports, each of the spaced-apart first and second outer foot supports and the spaced-apart first and second inner foot supports are arranged to extend inwardly into the foot-receiving chamber in directions generally toward the motion-control guide post that is located generally in the center of the foot-receiving chamber, the outer foot supports are located in stationary positions in outer corners of the foot-receiving chamber, and the inner foot supports are located in stationary positions along opposite side walls forming boundaries of the foot-receiving chamber.

21. The child restraint of claim 20, wherein the movable foot is engaged and supported on each of the foot supports when the movable foot is moved outwardly in the foot-receiving chamber in an outward direction to tiltable carrier cradle to assume the extended cradle-tilting position, the movable foot is disengaged from each of the foot supports when the movable foot is moved inwardly in foot-receiving chamber in an opposite inward direction relative to the tiltable carrier cradle to assume the retracted storage position because those foot supports owing to a 180° rotation of movable foot about the axis of rotation, will have moved in and now lie in companion external support-channels formed in the movable foot.

22. The child restraint of claim 18, wherein the motion-control guide post is configured to provide means for supporting the movable foot for axial motion along an axis relative to the tiltable carrier cradle between: (1) the retracted storage position; (2) a withdrawn rotation-ready position arranged to lie outside of the foot-receiving chamber so that the movable foot can be rotated about the axis between a first rotation position and a second rotation position; and (3) the extended cradle-tilting position, and the axis extends axially through a central passageway formed in the support sleeve of the movable foot.

23. The child restraint of claim 22, wherein the motion-control guide post is also configured to provide means for supporting the movable foot for rotation about an axis through an angle of about 180° between a first rotation position associated with retention of the movable foot in the retracted storage position in the foot-receiving chamber and a second rotation position associated with retention of the movable foot in the extended cradle-tilting position extending partly out of the foot-receiving chamber to allow manual rotation of movable foot on the motion-control guide post and about the axis between the first and second rotation positions to take place after the movable foot has been moved axially outwardly along the axis to the withdrawn rotation-ready position located wholly outside of the foot-receiving chamber formed in the tiltable carrier cradle.

24. The child restraint of claim 18, wherein the movable foot includes a top panel and a skirt appended to a perimeter edge of top panel, the top panel and skirt cooperate to form a shell having an interior region, and the support sleeve that is included in the movable foot is aligned with a central opening formed in the top panel and appended to an underside of the top panel to lie in a stationary position relative to the top panel and to mate in telescoping relation with the motion-control guide post of the tilt controller.

25. The child restraint of claim 24, wherein the top panel of movable foot is also formed to include an oblong finger-receiving slot that is sized and shaped to provide means to grip a topside and underside of the top panel when the movable foot occupies each of the retracted storage and extended cradle-tilting positions so that the movable foot can be moved easily along and about the axis to change the rotational orientation and position of movable foot along the axis and relative to the tiltable cradle carrier.

\* \* \* \* \*